United States Patent [19]

Axen et al.

[11] 4,386,806
[45] Jun. 7, 1983

[54] WELL REPAIR FOR IN SITU LEACHING

[75] Inventors: Steven G. Axen, Miami, Ariz.; Ray V. Huff, Littleton; Jerry R. Bergeson, Golden, both of Colo.

[73] Assignee: Occidental Minerals Corporation, Lakewood, Colo.

[21] Appl. No.: 236,843

[22] Filed: Feb. 23, 1981

[51] Int. Cl.³ .......................................... E21B 43/28
[52] U.S. Cl. ..................................... 299/5; 166/295; 405/264
[58] Field of Search ....................... 299/4, 5; 166/295; 175/72; 405/264

[56] References Cited

U.S. PATENT DOCUMENTS

| 3,583,167 | 6/1971 | Parks | 166/294 X |
| 3,733,833 | 5/1973 | Parks | 405/264 |
| 3,795,276 | 3/1974 | Eilers et al. | 166/295 |
| 3,967,681 | 7/1976 | Curzon | 166/277 |
| 4,018,286 | 4/1977 | Gall et al. | 166/295 |
| 4,091,868 | 5/1978 | Kozlowski et al. | 166/295 X |

OTHER PUBLICATIONS

Brochure re Dowell Additive M-174, Dowell Division of the Dow Chemical Company, Tulsa, Okla. 74102.

Primary Examiner—Ernest R. Purser
Attorney, Agent, or Firm—Christie, Parker & Hale

[57] ABSTRACT

A permeable region adjacent a well bore used in an acidic in situ leaching system can be repaired by introducing a non-acidic liquid for displacing acidic leach liquid from the permeable region, introducing into the well bore a basic composition including a polymeric material that gels under acidic conditions, and applying sufficient pressure to the well bore to displace at least a portion of the basic composition and polymeric material from the well bore into the permeable region adjacent the well bore. Liquid flow in the well bore is then discontinued for a sufficient time for acid remaining in the subterranean formation adjacent the well bore to contact such polymeric material and cause gelation of the polymeric material in the permeable region. The introduction of acidic leach liquid can then continue.

24 Claims, 1 Drawing Figure

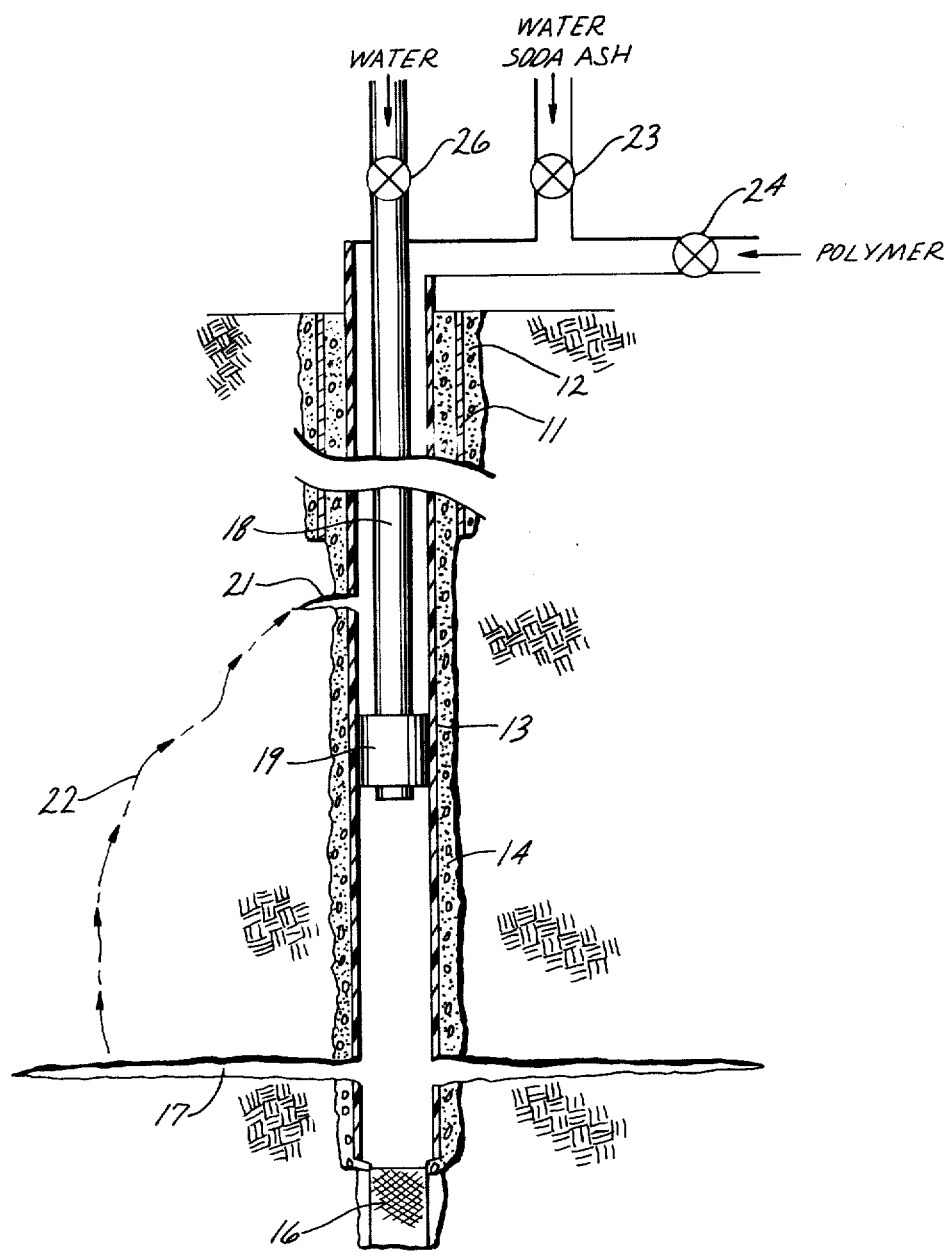

WELL REPAIR FOR IN SITU LEACHING

FIELD OF THE INVENTION

This invention relates to leaching of mineral values from subterranean formations and particularly to repair of leakage through formation adjacent the well. Well repair can be effected by squeezing a pH sensitive polymer from the well bore into surrounding formation.

BACKGROUND

In some circumstances, it can be desirable to leach mineral values from subterranean formation without conducting any mining operations. Such a technique can be useful, for example, where the grade or location of the ore body or geologic conditions make extraction of the mineral values by conventional mining uneconomical. In such a situation, it can be desirable to leach the mineral values directly from the in situ subterranean formation.

In an exemplary in situ leaching operation, two or more wells are drilled to the portion of the subterranean formation containing desired mineral values. A leachant or lixiviant can be introduced in one or more wells to permeate the subterranean formation and a pregnant solution containing dissolved mineral values can be withdrawn from one or more adjacent wells.

For example, a plurality of wells can be drilled several hundred feet to an ore body containing copper minerals to be leached. These can be oxidized copper minerals which are considered "soluble" since they can be dissolved in sulfuric acid solution, or "insoluble" copper minerals such as sulfides which require oxidation before they can be dissolved. A sulfuric acid solution, which can also contain ferric sulfate or the like for oxidizing insoluble copper minerals, is introduced as a leachant through one or more such wells. Sufficient pressure is maintained in the inlet well that the leach liquid permeates through the copper ore body to one or more outlet wells. A pregnant solution containing copper values leached from the subterranean formation is withdrawn from the outlet well. The leach solution can flow through inherent permeability in the formation or at least in part through artificially induced permeability. Such artificial permeability can be produced in the subterranean formation by hydraulic fracturing, for example.

The inherent permeability in many subterranean formations can be rather low and to obtain a reasonable volume of flow of liquid through the formation, rather high pressure gradients can be employed between inlet and outlet wells. An inlet well can, for example, have a wellhead pressure of several hundred psi. This pressure is superimposed on the hydrostatic head of the column of liquid in the well. In an embodiment where flow from an outlet well is induced by pressure applied to an inlet well, the outlet well has the hydrostatic head of pregnant solution in the well. Alternatively, the pressure in an outlet well can be substantially less than the hydrostatic head where a submersible pump or air lift is employed for withdrawing pregnant solution.

After a well for in situ leaching has been drilled, it may be completed with fiber reinforced plastic pipe as a well bore casing. Such glass fiber reinforced plastic pipe is inserted in the well bore and the annulus between the pipe and surrounding formation is closed by pumping a grout of Portland cement or the like around the casing. This provides a casing in the well bore which is resistant to leach solutions such as sulfuric acid.

It is desirable to localize the introduction or withdrawal of liquid between the well bore and surrounding formation. The casing is, therefore, perforated at a desired elevation in the well. Standard perforating tools employing projectiles, explosive charges, cutters, or the like, as commonly employed in oil wells are used for perforating the casing in a well for in situ leaching. If desired, hydraulic fractures can be induced adjacent such perforations. Such fracturing is induced after isolating a section of the well bore at the elevation where fracturing is desired. This section can be isolated by a conventional packer when near the bottom of a well or by a conventional straddle packer when at an elevation remote from the bottom of the well. Sufficient hydraulic pressure is applied in the isolated section of the well to induce fracturing of formation adjacent the well.

When a well is used for introducing leach liquid, it can be desirable to insert tubing down the casing and set a packer in the casing at an elevation above the perforations through the casing through which it is desired to introduce leach liquid. Leach liquid is then introduced through such tubing so that hydraulic pressure is applied only in the portion of the casing below the packer. This avoids subjecting the entire casing to the elevated pressures employed for inducing flow of leach liquid through the formation.

Damage to the plastic casing can occur when various tools are run in the well and the casing can deteriorate in some situations when subjected to prolonged elevation pressure and strong leaching solutions. Such damage can result in undesired flow of leach liquid between the well bore and surrounding formation. Thus, it sometimes occurs that a path for fluid flow can occur between a portion of the casing below the packer and a damaged portion of the casing above the packer. This flow can be through a portion of the annulus around the casing where the cementing is inadequate or can be through permeability in the formation surrounding the well bore. Damage to the casing can result in leakage of leach liquid into the annulus between the inlet tubing and the casing set in the well. Since such leakage is undesirable for a number of reasons, it is important to have means for repairing the well for stopping or limiting such flow of leach liquid.

A technique sometimes employed for repair of well bores is known as a cement squeeze. In such a technique, a portion of a well bore to be repaired is isolated by a straddle packer or the like. A grout of Portland cement, pozzolana cement, or the like is introduced into the isolated section of the well bore and sufficient pressure is applied to squeeze grout from the casing into porous regions outside the casing. Excess grout can be flushed from the well bore or if it should set in the well bore, the hardened cement can be drilled out.

A cement squeeze job ordinarily calls for brining a service company to the well to perform the cementing. Cement squeezes are required only occasionally and the service companies provide the specialized equipment and expertise for performing this job. Appreciable time can be lost waiting for a service company to respond when a request is made for a well repair. Such service companies are primarily located in areas where there is petroleum production and in situ leaching operations can be rather remote from such locations. Thus, distance as well as scheduling of the service company can cause appreciable time delays. The additional travel distance can also add to the already expensive costs involved in making a cement squeeze.

It is, therefore, desirable to provide a technique for repairing a well bore for in situ leaching operations which can be done quickly and with equipment ordinarily at the in situ leaching site. The technique should be inexpensive, fast, and readily accomplished by field personnel.

BRIEF SUMMARY OF THE INVENTION

There is, therefore, provided in practice of this invention according to a presently preferred embodiment a technique for repairing a well bore employed in an acidic in situ leaching system. At least one well is drilled in subterranean formation and an acidic leachant is introduced into subterranean formation through such a well. Permeability of a region adjacent the well can be reduced for repairing such a well bore by first injecting a non-acidic liquid into a portion of formation for displacing acid. A basic liquid containing a polymeric material that gels under acidic conditions is then pressure injected into the formation. Liquid flow in the well is then discontinued for a sufficient time for acid in the formation to contact and polymerize or gel the polymeric material. Thereafter, introduction of acidic leachant can be resumed.

DRAWING

These and other features and advantages of the present invention will be appreciated as the same becomes better understood by reference to the following detailed description when considered in conjunction with the accompanying drawing which illustrates semi-schematically an exemplary well involved in practice of this invention.

DESCRIPTION

The drawing illustrates in schematic vertical cross-section an exemplary well for in situ leaching. Such a well can be employed for introduction of leach liquid into an ore body containing leachable mineral values such as, for example, copper-bearing minerals. Such a well is commenced by drilling a relatively large diameter hole from the ground surface to a depth determined by local conditions and governmental regulations. A so-called surface casing 11 is set in the hole and the annulus between the surface casing and the borehole is filled with a cement grout 12. The balance of the well is drilled at a smaller diameter through the surface casing to a desired depth. When the desired depth has been reached, a glass fiber reinforced plastic pipe casing 13 is set in the well to near the bottom, and the annulus between the plastic pipe and the borehole and between the plastic pipe and the surface casing is filled with a cement grout 14. If desired, an intermediate steel casing can also be employed in the well bore for additional strength and potential utility in refurbishing a well.

Miscellaneous other features can be included in a well, such as, for example, a plastic screen 16 in a portion of the hole open to the formation at the bottom of the plastic pipe casing 13. A variety of conventional valves, check valves, pressure gauges, and the like can be connected to the well head and are omitted from the drawing. Only certain connections employed in practice of this invention are indicated schematically in the drawing.

After the well has been completed as described, one or more fractures 17 indicated as an exaggerated crevice in the drawing can be formed adjacent the well for introducing and/or withdrawing leachant between the well bore and the surrounding subterranean formation. The plastic casing is perforated at a desired elevation and sufficient hydraulic pressure is applied for fracturing formation adjacent the well bore. Standard techniques for perforating the casing and commencing, enlarging, and propping fractures can be employed. Such techniques are, for example, described in *Hydraulic Fracturing* by G. C. Howard and C. R. Fast, published by The Society of Petroleum Engineers of A.I.M.E. (1970).

Following establishment of communication between the well bore and surrounding formation, in situ leaching of the subterranean ore body adjacent the well can commence. In an exemplary embodiment, stainless steel tubing 18 is inserted down the plastic casing and a conventional packer 19 is set in the casing to isolate the region of the casing perforations from the balance of the well bore. Leach solution is then introduced through the tubing 18 to the region of the well bore isolated by the packer. Sufficient pressure is applied for injecting the leach liquid into the formation adjacent the perforations through the casing and inducing flow of leach liquid to an adjacent outlet or recovery well (not shown) from which leach liquid is withdrawn.

In the illustrated embodiment, it is assumed that damage to the plastic pipe casing 13 has occurred so that a perforation or hole 21 is present at a location above the packer 19. This permits fluid communication between the surrounding subterranean formation and the annulus between the downhole tubing 18 and the plastic well casing 13. Such damage to the well can occur for a variety of reasons which are not significant for practice of this invention.

In the illustrated embodiment, it is also assumed that leakage of liquid occurs from a fracture 17 to the hole 21 above the packer, as indicated by the phantom line flow path 22. Such leakage is readily detected as a pressure rise or discharge of liquid from the annulus between the tubing and casing. Such bypassing of leach liquid from the perforations below the packer to a damaged location above the packer can extend through permeable regions of the subterranean formation, through artificially induced fractures in undesired locations, through highly permeable geologic structures such as fault planes, or along the casing and/or well bore. Regardless of the path, such flow is considered undesirable and should be rectified.

The elevation of the damage to the casing can be determined by raising the packer and setting it at different elevations until leakage to the annulus is cut off. The packer is then set in the casing at an elevation just below the damaged portion to isolate the damaged portion from lower elevations in the well. If desired, a straddle packer can be inserted in the well for isolating the damaged section from portions of the well bore both above and below the damaged region. If desired, the magnitude of the portion of the formation to be sealed in practice of this invention can be determined. Liquid containing a dye or other tracer can be injected in the damaged portion and the presence of the tracer detected below the packer. The volume of liquid injected for circulating the tracer indicates the volume of the leakage path to be sealed. Alternatively, the volume of sealant to be used can be estimated, or the quantity can be based on available tankage and the like at the well site.

Repair of the well is accomplished by injecting a water soluble polymeric material into formation adjacent the damaged portion of the casing by way of the well bore. As is customary in high polymer terminology, the polymeric material is referred to herein as water soluble regardless of whether it forms a true solution or is actually in the form of a substantially stable dispersion of polymeric material suspended in water. Such a polymer can be pumped into the well by conventional pumping equipment rather than the special pumps used for abrasive cements used in squeeze cementing. The polymeric material polymerizes or gels in an acidic environment or in contact with multivalent cations in acidic or neutral solution. The gel has a generally rubber-like consistency capable of completely plugging pores and flow paths in formation adjacent the well and sufficiently strong to avoid displacement in relatively large openings under the pressures involved during in situ leaching.

Suitable polymers are described in detail in U.S. Pat. Nos. 3,583,167 and 3,733,833, which are hereby incorporated by reference. Such polymeric material is available from the Dowell Division of The Dow Chemical Company, Tulsa, Okla., 74102, as Dowell Additive M-174. This material is marketed to assist in preventing pollution caused by the migration of acidic fluids through refuse, soil, and geologic formations. For example, it may be used to help vegetate refuse heaps containing pyrites and to control acid drainage from mines. Solutions of Dowell Additive M-174 react with acid mine waters to form acid insoluble precipitates which are capable of plugging soil and rock permeability. It is available as a low density brown powder which forms a viscous basic solution or suspension in water. A suitable consistency of M-174 polymer for practice of this invention is about 0.3 pounds of additive per gallon of water.

Subterranean formation adjacent a well employed for in situ leaching of copper minerals, for example, is exposed to leach liquid containing sulfuric acid and hence is strongly acidified. Residual liquid in the formation can also contain appreciable metal such as copper sulfate. Contact of such acidified formation by the solution of polymeric material could result in premature polymerization and plugging. A volume of non-acidic liquid such as water is, therefore, injected into the formation in advance of the solution of polymeric material. The non-acidic liquid is pumped into the annulus at the well head through a valve 23. Water or a soda ash solution (sodium carbonate) are suitable inexpensive materials to use as a "spearhead" in advance of the polymeric solution. If desired, water can be injected for a portion of the non-acidic liquid, followed by a portion of soda ash solution to assure that the formation is at least temporarily basic. Other neutral or basic solutions will be apparent.

When a water preflush is used instead of a basic solution, it is desirable that a soda ash solution be readily available for injection in the event continuity between the water preflush and polymer injection is disturbed; the soda ash solution can be used to prevent premature gelation of the polymeric material.

The volume of non-acidic liquid injected into the formation through the damaged region of the casing is preferably about one to two times the volume of solution of polymeric material to be injected. Liquid tends to flow along the leakage path more or less by plug flow. This quantity of liquid is, therefore, sufficient for diluting and displacing most of the acid along the flow path. If less than this volume of fluid is employed, sufficient acid may remain along the flow path to cause premature gelation or polymerization of the polymeric material. If the quantity of non-acidic liquid is more than about twice the volume of solution of polymeric material, an excess quantity of acid may be neutralized or displaced from the formation. At least the initial gelation of the polymeric material is caused by migration of acid and/or metal cations remaining in the acidified formation. An excess quantity of non-acidic liquid in advance of the solution of polymeric material may inhibit initial gelation.

Following injection of the non-acidic liquid, a solution of polymeric material is injected into the formation by way of the damaged portion of the casing. The solution is pumped into the annulus between the tubing and casing through a valve 24 and sufficient pressure applied to displace the material into the formation.

Following injection of a selected quantity of the solution of polymeric material, additional water or soda ash solution is introduced through the valve 23 for displacing substantially all of the solution of polymeric material from the annulus between the tubing and casing. The volume of non-acidic liquid is about the same as the volume of the annulus. This prevents undesired gelation of the polymer in the casing.

As the above described materials are injected into the annulus between the tubing and casing, it can be desirable to maintain a back pressure in the tubing and hence in the portion of the well below the packer. This not only prevents leakage past the packer, but also helps direct the polymeric material to its desired location in the formation. Back pressure is maintained by introducing water through a valve 26 connected to the tubing. If desired, an acid solution can be used to promote gelation upon contact of the polymeric solution with liquid introduced below the packer. The back pressure below the packer can be about the same as the pressure used for introducing polymeric material into the formation or can be somewhat lower so that such material tends to concentrate in the flow path 22.

After introducing non-acidic liquid into the well annulus to displace polymeric material from the well bore, the well is "shut in". Liquid flow to or from the well bore is terminated so that little, if any, further displacement of polymeric material occurs. The well can be shut in at ambient pressure at the well head or at an elevated pressure. The well is left shut in for about one to four days so that the polymeric material has ample time to gel or set.

Gelation of the polymeric material occurs as acid and metal cations in the subterranean formation migrate into contact with the polymeric material. Some acid remains in the formation following the flush with non-acidic liquid, either in temporary combination with minerals or isolated in crevices, pockets, and the like from which the acid is not displaced during flushing.

The presence of ferric sulfate, dissolved copper, and the like in the formation following the non-acidic flush are beneficial since gelation of the polymeric material is promoted by multivalent cations as well as hydrogen ion. Fluid flow through the well bore is discontinued long enough that such acid and metal cations in the formation can induce substantial gelation of the polymeric material. It is believed that about one day is sufficient for migration of the acid and initial gelation of the polymer under most circumstances. Shutting the well in for more than about four days is not believed necessary. Further, it is not believed necessary to have complete gelation of the polymeric material when at least partial use of the well for in situ leaching operations is resumed. Substantial resistance to displacement of the polymer is provided by incomplete gelation and gelation can proceed to completion rapidly once additional acid is injected in the well for in situ leaching.

In the event some of the polymeric material gels in the well bore, it can be removed by simply flushing with soda ash solution or the like. Gelation by acid is reversible and basic solution can be used to redissolve the gelled polymer.

The polymeric material is essentially non-hazardous, hence, can be readily handled at the well site without special precautions or highly trained personnel. The material is inexpensive and stable and a quantity can be kept on site for use when needed, thereby avoiding delays waiting for delivery of material. The powder is easily mixed with water to the desired strength and consistency using pumps and auxiliary tanks usually available at a well site. For example, mixing is easily accomplished by use of a "mud gun" jet mixer, such as is commonly used for mixing drilling mud additives. Recirculating the mixture through the well injection pumps back into the auxiliary tanks assures complete and uniform mixing. Special pumps are not needed since the polymer is not abrasive. The entire operation can be performed with equipment commonly present at an in situ leaching operation.

It is preferred to employ a polymeric material that gels in contact with acid as the sole means for repairing leakage adjacent a well bore. This is desirable since delay and cost are incurred by combining the polymer repair with a cement squeeze. Further, a cementitious grout tends to be very basic and can adversely affect the gelation of the polymer. Cement grout can form a "filter cake" near a well bore which limits the volume of material injected into the formation. If grout sets in the well bore, redrilling may be needed for its removal, adding to cost and delay as well as exposing the casing to the possibility of further damage.

EXAMPLE

An experimental well for in situ leaching of copper ore was completed to a depth of about 1150 feet below the ground surface. A 4.8 inch inside diameter glass fiber reinforced plastic pipe casing was cemented in the well bore. A perforated zone was formed through the casing at an elevation between 1060 and 1080 feet below the ground surface for injection of sulfuric acid solution for leaching copper minerals. A stainless steel packer was set on two inch stainless steel tubing in the well at an elevation of about 1030 feet below the ground surface. When sulfuric acid leaching solution was injected into formation adjacent the well through the perforated zone, a leak into the annulus between tubing and casing above the packer was observed. A blue copper solution was produced from the annulus during injection of acid leach solution below the packer. Acid was injected into the formation intermittently for a total time of about ten hours after the leakage was observed. Since leakage continued, a repair of a damaged zone believed to be at an elevation of about 882 to 892 feet below the ground surface was attempted. It was believed that damage was at this elevation since a previous repair had been made using about 750 gallons of polymer solution, followed by a cement squeeze. Results of use of the polymer are unknown; the cement squeeze was initially successful, but later failed. Evidence that the damage was at about 882 feet was obtained when the packer was moved above this zone. Solution injected through the tubing produced no liquid from the annulus. Analysis of the solution recovered from the annulus showed presence of copper, indicating that leach solution was flowing through an ore zone to the damaged portion of the casing rather than travelling along the well casing and cement.

A packer on a stainless steel tubing string was set below the damaged zone. Water was injected into the annulus between the tubing and casing to determine the flow rate through the damaged zone. At the same time, about 250 gallons of water were injected through the tubing to the zone below the packer at a rate less than 30 gallons per minute for a total time of about 21 minutes. This maintained a tubing pressure of about 520 to 560 psi. The annulus pressure varied from about 80 to 250 psi. It was found that about 30 gallons per minute of liquid flowed into the damaged zone at a pressure of about 200 psi.

About 3000 gallons of solution of polymeric material were made in an auxiliary tank at a concentration of about 0.3 pounds of Dowell M-174 additive per gallon of water. The polymer was well mixed by pumping through the injection pump back into the auxiliary tank prior to injection to assure that all lumps of polymer were broken up. The polymer was circulated for at least about one-half hour before injection and circulated during injection to assure that the polymer remained in suspension in the water.

About 2460 gallons of water were injected into the annulus at a rate of about 30 gallons per minute for 82 minutes as a pre-flush to displace acid from the damaged zone. During this time, wellhead pressure rose to about 200 psi.

The polymer solution was then injected into the annulus between the tubing and casing concurrent with injection of water into the tubing. Initially, the rate of injection of water in the tubing was about 30 gallons per minute and it thereafter dropped to about 2 gallons per minute. Wellhead pressure in the tubing ranged between about 300 and 500 psi. Shortly after injection of water into the tubing was commenced, injection of polymer into the annulus was commenced with a flow rate of about 30 to 34 gallons per minute. Pressure in the annulus varied from about 200 to 450 psi. Polymer was injected into the annulus for about 47 minutes for a total injection of about 2595 gallons.

Injection of polymer solution was followed by introduction of 1% soda ash solution into the annulus at a rate of about 30 gallons per minute for about 19 minutes. About 570 gallons of soda ash solution were injected for displacing polymer from the well bore.

The well was shut in after introduction of soda ash with an annulus pressure of about 250 psi. The annulus pressure dropped to zero in about 2 hours and 45 minutes. The well was left shut in for about 87 hours to allow the polymer to gel.

Injection of acidic leach liquid through the tubing into the portion of the well below the packer commenced four days after the above-described repair. The injection pressure reached a maximum of about 940 psi at the well head at a flow rate of about 15 gallons per minute. After three weeks or so, the wellhead pressure remained steady at about 960 psi and a flow rate of about 49 gallons per minute. No leakage into the annulus was noted. Before, the repair injection pressure was about 400 psi at 40 gallons per minute. It was concluded that a satisfactory repair was made with equipment available at the well site without need for a service company.

Although described herein in an exemplary embodiment with respect to an in situ leaching technique employing sulfuric acid and a polymeric material that gels under acidic conditions, it will be apparent that similar principles can be employed in a in situ leaching system employing basic leaching solutions wherein the polymeric material is in acidic solution when injected and gels in situ when subjected to basic conditions. Such basic in situ leaching is employed, for example, with sodium carbonate for leaching uranium ores or ammoniacal solutions for some types of copper ore. Similarly, the exemplary embodiment concerns as inlet or injection well into which a leach liquid is introduced. It will be apparent that similar techniques can be used adjacent an outlet or recovery well. Formation adjacent such a well is acidified by leach liquid from an inlet well since the pregnant solution remains acidic. The pregnant solution can also contain multivalent metal cations which can also cause gelation of the exemplary polymeric material.

If desired, so-called lost circulation or bridging materials can be included in the solution of polymeric material injected in the well bore. Such lost circulation materials include substantially inert fibers, silica flour, sand, vermiculite, or the like which tend to plug permeable portions of the well bore and/or surrounding subterranean formation. Such lost circulation materials can be included for reinforcing the gelled polymeric material.

Many other modifications and variations will be apparent to those skilled in the art. It is, therefore, to be understood that within the scope of the appended claims, this invention may be practiced otherwise than as specifically described.

What is claimed is:

1. In an in situ leaching system utilizing an acidic material as a leachant, a method for repairing a permeable portion of a well bore for such in situ leaching system comprising the steps of:
    isolating such a permeable portion of the well bore;
    introducing into the isolated portion of the well bore a non-acidic aqueous liquid for displacing at least a portion of such acidic material from a region of subterranean formation adjacent the permeable portion of the well bore;
    introducing into the isolated portion of the well bore a basic aqueous composition including a polymeric material that gels under acidic conditions;
    applying sufficient pressure to the isolated portion of the well bore to displace at least a portion of the basic aqueous composition from the well bore into the region of subterranean formation adjacent the well bore;
    introducing sufficient non-acidic aqueous liquid into the well bore for displacing at least a portion of such polymeric material from the well bore; and
    discontinuing liquid flow through the well bore for a sufficient time for residual acidic material in the subterranean formation to gel such polymeric material.

2. A method as recited in claim 1 wherein the volume of non-acidic aqueous liquid introduced into the well bore before the aqueous composition containing polymeric material is in the range of from about one to two times the volume of the aqueous composition containing polymeric material.

3. A method as recited in claim 2 wherein the non-acidic aqueous liquid introduced before the aqueous composition containing polymeric material has a basic pH.

4. A method as recited in claim 1 wherein the non-acidic aqueous liquid introduced into the well bore after the aqueous composition containing polymeric material has a basic pH.

5. A method as recited in claim 4 wherein the volume of basic liquid introduced into the isolated portion of well bore is about the same as the volume of the isolated portion of the well bore.

6. A method as recited in claim 1 wherein liquid flow through the well bore is discontinued for at least about one day and thereafter acidic leach liquid is introduced to the well bore.

7. A method as recited in claim 1 wherein the permeable portion is isolated by setting a packer in the well bore below the permeable portion, and further comprising applying pressure below the packer while applying pressure to the isolated portion of the well bore.

8. A method for repairing a permeable region of subterranean formation adjacent a well bore in such formation in an in situ leaching system comprising the steps of:
    introducing leach liquid having a first pH into such a permeable region of subterranean formation adjacent the well bore;
    introducing into the well bore an aqueous liquid having a pH different from the first pH for displacing leach liquid from the permeable region of the formation adjacent the well bore;
    introducing into the well bore an aqueous solution of polymeric material that gels at the first pH, the solution being at a second pH different from the first pH for preventing gelation of the polymeric material;
    applying sufficient pressure to the well bore to displace at least a portion of the aqueous solution of polymeric material from the well bore into the permeable region of the formation adjacent the well bore;
    introducing into the well bore sufficient aqueous liquid having a pH different from the first pH for displacing polymeric material from the well bore; and
    discontinuing liquid flow through the well bore for a sufficient time for residual leach liquid adjacent the permeable region of the formation to change the pH of the aqueous solution and gel such polymeric material.

9. A method as recited in claim 8 wherein the first pH is acidic and the second pH is basic.

10. A method as recited in claim 8 wherein the volume of aqueous liquid introduced before the aqueous solution of polymeric material is in the range of from about one to two times the volume of the solution of polymeric material.

11. A method as recited in claim 8 wherein the volume of aqueous liquid introduced for displacing polymeric material from the well bore is about the same as the volume of the well bore.

12. In an in situ leaching system utilizing an acidic leach liquid, a method for reducing permeability of a permeable region in a subterranean formation adjacent a well bore in such formation comprising the steps of:

introducing an acidic leach liquid into a permeable region of subterranean formation adjacent such a well bore;

introducing into the well bore a non-acidic aqueous liquid for displacing acidic material from the permeable region of subterranean formation;

introducing into the well bore a basic aqueous composition including a polymeric material that gels under acidic conditions;

applying sufficient pressure to the well bore to displace at least a portion of the basic aqueous composition from the well bore into the permeable region of subterranean formation adjacent the well bore;

introducing sufficient non-acidic aqueous liquid into the well bore for displacing such polymeric material from the well bore; and discontinuing liquid flow through the well bore for a sufficient time for residual acidic material in the subterranean formation to gel such polymeric material.

13. A method as recited in claim 12 wherein the volume of non-acidic aqueous liquid introduced into the well bore before the aqueous composition containing polymeric material is in the range of from about one to two times the volume of the aqueous composition containing polymeric material.

14. A method as recited in claim 13 wherein the non-acidic aqueous liquid introduced before the aqueous composition containing polymeric material has a basic pH.

15. A method as recited in claim 12 wherein the non-acidic aqueous liquid introduced into the well bore after the aqueous composition containing polymeric material has a basic pH.

16. A method as recited in claim 15 wherein the volume of basic liquid introduced into the well bore is about the same as the volume of the well bore.

17. A method as recited in claim 12 wherein liquid flow through the well bore is discontinued for at least about one day and thereafter acidic leach liquid is introduced to the well bore.

18. In an in situ leaching system utilizing an acidic leach liquid, a method for repairing a permeable portion of a well bore in a subterranean formation comprising the steps of:

introducing an acidic leach liquid into a region of subterranean formation adjacent such a permeable portion of the well bore;

setting a packer in the well bore for isolating the permeable portion of the well bore;

introducing into the isolated portion of the well bore a non-acidic aqueous liquid for displacing acidic liquid from the region of subterranean formation adjacent the permeable portion of the well bore;

introducing into the isolated portion of the well bore a basic aqueous composition including a polymeric material that gels under acidic conditions, the volume of basic aqueous composition being in the range of from about one-half to one times the volume of the non-acidic aqueous liquid;

applying sufficient pressure to the isolated portion of the well bore to displace at least a portion of the basic aqueous composition from the well bore into the region of subterranean formation adjacent the well bore;

introducing sufficient basic aqueous liquid into the well bore for displacing such polymeric material from the well bore;

discontinuing liquid flow through the well bore for at least about one day; and thereafter resuming introduction of acidic leach liquid into the subterranean formation.

19. A method as recited in claim 18 wherein the non-acidic aqueous liquid introduced before the aqueous composition containing polymeric material has a basic pH.

20. A method as recited in claim 18 further comprising applying pressure below the packer while applying pressure to the isolated portion of the well bore.

21. An in situ mineral leaching process comprising:

drilling at least one well to a subterranean formation containing leachable mineral values;

introducing acidic leach solution into the subterranean formulation through such a well;

reducing permeability of a permeable portion of the formation by the steps of:

injecting a non-acidic liquid into the permeable portion of subterranean formation for displacing a portion of the acidic leach solution;

injecting into the permeable portion of the formation a solution containing a polymeric material that gels under acidic conditions; and discontinuing liquid flow in the permeable portion of the formation for a sufficient time for residual acid in the permeable portion of the formation to cause gelation of at least a portion of the polymeric material; and resuming injection of acidic leach liquid into the subterranean formation through such a well.

22. A method as recited in claim 21 wherein the volume of non-acidic liquid introduced into the well bore before the solution containing polymeric material is in the range of from about one to two times the volume of the solution containing polymeric material.

23. A method as recited in claim 21 wherein the non-acidic liquid introduced before the solution containing polymeric material has a basic pH.

24. A method as recited in claim 21 wherein liquid flow through the well bore is discontinued for at least about one day and thereafter acidic leach liquid is introduced to the well bore.

* * * * *